April 15, 1952   F. E. PAYNE   2,592,728
ROTARY MECHANICAL SEAL
Filed Dec. 4, 1948

INVENTOR.
Frank E. Payne
BY
Charles P. Vrtich
Atty.

Patented Apr. 15, 1952

2,592,728

UNITED STATES PATENT OFFICE 2,592,728

ROTARY MECHANICAL SEAL

Frank E. Payne, Glencoe, Ill., assignor to Crane Packing Company, Chicago, Ill., a corporation of Illinois Application December 4, 1948, Serial No. 63,567

3 Claims. (Cl. 286—11.14)

This invention relates to rotary mechanical seals which utilize an endless ring of packing to effect a seal between an axially movable sealing washer and a support therefor.

In my co-pending applications, Serial Nos. 701,371, filed October 4, 1946, now Patent No. 2,561,132, and 717,669, filed December 21, 1946, now abandoned, there are disclosed rotary mechanical seals utilizing endless rings of rubber or the like having a circular radial cross-section for effecting a seal between a rigid sealing washer and a support therefor. In these prior disclosures the endless ring contacts the washer and the support directly in one way or another either through spring pressure or by physical compression between the two. It has been found, however, that in these prior constructions the endless sealing ring is affected directly by the action of the sealing washer so that if the sealing washer should be constrained to vibrate due to imperfections in the design of the cooperating sealing member or its support, the vibration will be transmitted directly to the endless ring. It is desirable, however, to maintain pressure conditions as uniform as possible around the endless ring in order to avoid any possibility of a leak.

The principal object of this invention is to provide a construction for a rotary mechanical seal using an endless packing ring and a rigid sealing washer wherein an intermediate member is used between the washer and ring such that the washer may vibrate relative to the intermediate member without directly affecting the endless ring, and the endless ring may likewise move relative to its support without in any way affecting the washer.

A feature of this invention is a seal design wherein the radial dimension of the seal may be reduced because of the use of a thin and strong intermediate member between the endless sealing ring and the rigid sealing washer.

Another feature of this invention is a resilient gasket which is interposed between the sealing washer and spring such that the washer may vibrate relative to the spring without directly transmitting its vibration to the sealing member.

Figure 1:
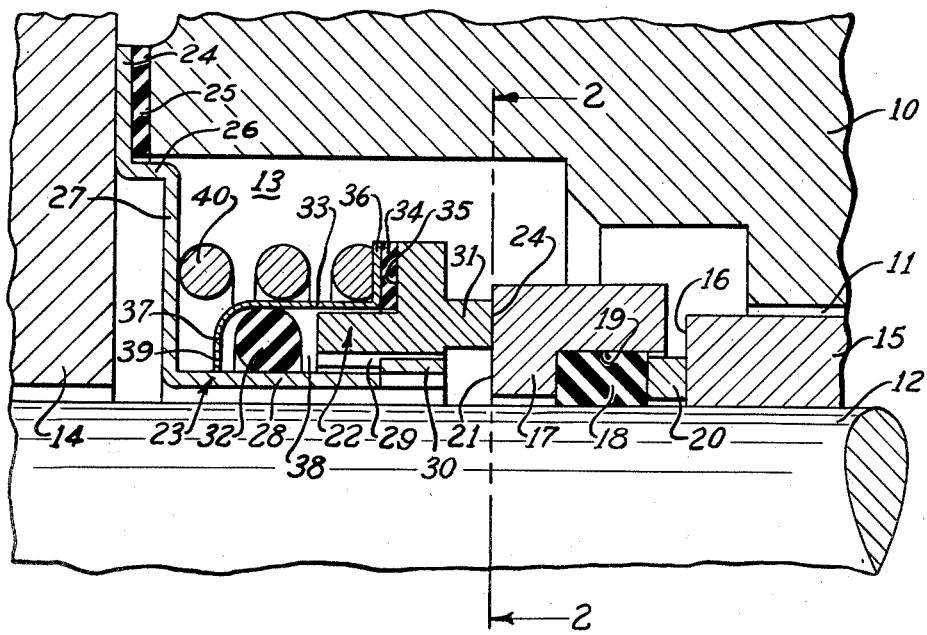
Figure 2:
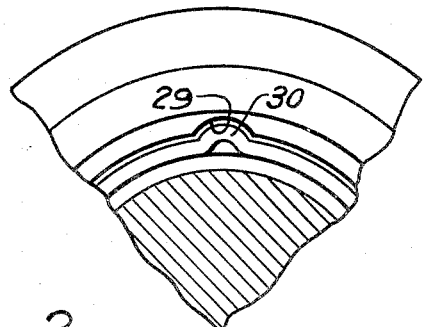

These and other objects and features of this invention will become apparent from the following detailed description when taken together with the accompanying drawings, in which:

Fig. 1 is a fragmentary quarter-section through a seal embodying the features of this invention; and Fig. 2 is a fragmentary side elevation of the seal of Fig. 1 taken along line 2—2 thereof.

Referring now to the drawings for a detailed description of the invention, there is shown a machine housing 10 which may be the body of a compressor or the like having an opening 11 therethrough into which extends a rotatable shaft 12. The opening 11 is in communication with a fluid which may be a refrigerant, in either a liquid or gaseous state, and which is to be sealed with respect to the exterior of housing 10. Said gas may be at a pressure other than atmospheric so that it will tend to escape through opening 11 unless the opening is sealed.

Said opening 11 is enlarged at 13 to form a seal chamber which is adapted to be substantially closed by a closure-plate 14 which may be bolted or otherwise secured (not shown) to housing 10.

Shaft 12 is provided with a sleeve 15 which provides a rotary abutment 16 rotatable with shaft 12. Inasmuch as the seal is to be effected between rigid relatively rotatable sealing elements, said elements must be very carefully ground and lapped so as to provide a perfectly flat and smooth surface for sealing purposes. Such elements are more readily formed as separate entities which are later assembled with respect to the shaft. Thus, a seal seat in the form of a metal ring 17 is provided, the ring 17 being mounted on another ring 18 of rubber or the like which is compressed in a recess 19 in said ring 17 and against shaft 12, thereby forming a fluid-tight flexible support for seat ring 17. A spacer ring 20 is also provided between abutment 16 and rubber ring 18 so as to avoid contact between seat ring 17 and bushing 15. The ring 17 is provided with a radially disposed surface 21 which functions as the seal surface and hence is ground and lapped so as to be perfectly flat and smooth. It is understood that the ring 18 will be compressed against shaft 12 by seat ring 17 and will provide a friction drive for said seat ring 17 so that the latter will be rotatable with shaft 12 at all times.

The cooperating portion of the rotary mechanical seal of this invention is comprised of a sealing washer 22 formed from a material which will run well against the material of ring 17 without undue wear. There are many such materials on the market and hence no detailed description is believed necessary here. Said washer 22 is formed with an annular seal nose 31 having a radially disposed sealing surface 24 in frictional contact with surface 21 of seat ring 17. Said surface 24 is similarly ground and lapped so as to be perfectly flat and smooth, and, when running against surface 21, provides a fluid-tight joint.

Washer 22 is supported principally from a stamping 23 which functions somewhat as a closure-plate and which is compressed at its outer peripheral region 24 between closure-plate 14 and housing 10, there being a gasket 25 between outer region 24 and housing 10 to insure a fluid-tight seal thereat. A shoulder 26 in stamping 23 assists in centering the stamping in the seal chamber 13. The remainder of the stamping is comprised of a radially extending wall 27 and an axially extending flange 28 spaced from shaft 12 and adapted to encircle said shaft.

It is desirable to prevent relative rotation between washer 22 and its supporting stamping 23 while permitting relative axial movement therebetween so that washer 22 can advance towards seal seat 17 as the cooperating surfaces 24 and 21 wear. To this end, the interior surface of washer 22 is provided with an axially extending groove 29, and flange 28 is provided with a radially outwardly extending lug 30 which extends into groove 29, thereby preventing relative rotation between the washer and stamping. The groove 29 and lug 30 are shown to better advantage in Fig. 2. It will be apparent that inasmuch as groove 29 is coextensive with the interior surface of washer 22, the latter may move freely in an axial direction relative to stamping 23.

A flexible fluid-tight seal is provided between washer 22 and stamping 23 by means of an endless ring 32, an intermediate pressure transmitting member 33, and an endless gasket 34. Said gasket 34 abuts on a radially disposed surface 35 on washer 22 and contacts member 33 through a radially extending flange 36 thereon. Intermediate member 33 is generally cylindrical in shape and is slightly larger in internal diameter than the external diameter of the right-hand portion (Fig. 1) of washer 22 such that said washer may have a slight universal movement relative to member 33. Said member 33 is provided with a radially inwardly extending flange 37 which with washer 22 defines an annular space 38 in which ring 32 is confined. Said ring 32 is preferably of circular radial cross-section and is commonly known as an O ring. The radial dimension of the ring 32 is normally slightly greater than the radial dimension of space 38 such that ring 32 is under compression when installed in the said space. This compression insures a fluid-tight seal between flange 28 on supporting stamping 23 and intermediate pressure member 33. The axial dimension of space 38 is greater than the axial dimension of ring 32 when the latter is installed so that said ring may be free to roll slightly in the space if desired. It is understood, of course, that the amount of roll permitted may be varied to suit individual requirements. It should be noted that flange 37 is notched at 39 so as to permit member 33 to be slid past lug 30 when the seal is assembled.

Member 33 is urged against washer 22 by a spring 40 which is compressed between flange 36 and the radial portion 27 of the stamping 23. The outer surface of intermediate member 33 is utilized to center and locate spring 40. Inasmuch as there is a loose fit between washer 22 and stamping 33, the spring pressure will be transmitted directly through flange 36 to gasket 34 and will thus be transmitted to washer 22 to maintain the latter in contact with seat ring 17.

In operation, stamping 23 will be held against rotation since it is clamped between closure-plate 14 and housing 10 and hence washer 22 will likewise be held against rotation by virtue of the lug 30. Any vibration in shaft 12 which is transmitted to ring 17 and washer 22 will not be transmitted to ring 32, or if transmitted, will be diminished in intensity due to absorption of some of the vibration by gasket 34. It is also possible to exert considerable pressure upon ring 32 by intermediate member 33 without transmitting that pressure to washer 22. Thus intermediate member 33 may be made of metal as a stamping and washer 22 may be made of relatively brittle phenolic resin without any special provision being made in washer 22 to withstand severe tensile stresses.

It is understood that the foregoing description is illustrative of preferred embodiments of this invention and that the scope of the invention is not to be limited thereto, but is to be determined by the appended claims.

What is claimed is:

1. A seal for relatively rotatable elements having a sealing washer on one element, a seal seat on the other element, and means for effecting a seal between the washer and the said one element, said sealing means comprising a member defining an annular space adjacent said one element and having a substantially radially disposed abutment adjacent said washer, packing means disposed in the annular space and compressed radially between the member and said one element to effect a fluid-tight seal therebetween, and resilient sealing means disposed between the abutment and the washer to effect a fluid-tight seal between said washer and member, said packing means comprising an endless ring of resilient compressible material having a circular radial cross-section, and said member being axially movable.

2. A seal device for effecting a seal between a shaft and a housing therefor, said seal comprising an axially flanged closure member secured to the housing and having an opening through which the shaft extends, a sealing washer mounted on the flange and having a radially extending abutment on the outer periphery thereof, a pressure member encircling the flange and disposed between the washer and closure member, annular packing disposed between the washer and pressure member to effect a fluid-tight seal therebetween, annular flexible packing between the pressure member and flange, and spring means compressed between the closure-plate and pressure member and compressing the annular packing between the pressure member and washer.

3. A seal device for effecting a seal between a shaft and a housing therefor, said seal comprising a closure plate having an axial flange defining an opening through which the shaft extends, a seal seat rotatable with the shaft and disposed adjacent the flange, a seal washer encircling the flange and adapted to contact the seat with a fluid-tight fit, a stamping likewise encircling the flange and having a radially outwardly extending flange at one end in proximity to the sealing washer and a radially inwardly extending flange at the other end, said radially inwardly extending flange defining with the washer an annular space, an endless packing ring of flexible deformable material disposed in the annular space and compressed between the stamping and the flange on the closure plate to effect a fluid-tight seal therebetween, a packing ring disposed between the radially outwardly extending flange on the stamping and the washer, spring means compressed between the closure plate and the radially outwardly extending flange and compressing the last-mentioned packing ring against the washer to effect a flexible fluid-tight seal between the stamping and washer, and means for preventing relative rotation between the washer and flange.

FRANK E. PAYNE.

REFERENCES CITED

The following references are of record in the file of this patent:

UNITED STATES PATENTS

| Number | Name | Date |
|---|---|---|
| 1,097,074 | Bennett | May 14, 1914 |
| 2,113,167 | Baumheckel | Apr. 5, 1938 |